US010938859B2

(12) United States Patent
Chalmers et al.

(10) Patent No.: US 10,938,859 B2
(45) Date of Patent: *Mar. 2, 2021

(54) MANAGING PRIVILEGED SYSTEM ACCESS BASED ON RISK ASSESSMENT

(71) Applicant: International Business Machines Corporation, Armonk, NY (US)

(72) Inventors: Ewan Chalmers, Cork (IE); Eileen Hayes, Cork (IE); Michael J. Landers, Cork (IE); Richard O'Mahony, Cork (IE); Thierry Supplisson, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/563,771

(22) Filed: Sep. 6, 2019

(65) Prior Publication Data
US 2020/0007589 A1    Jan. 2, 2020

Related U.S. Application Data

(63) Continuation of application No. 15/258,310, filed on Sep. 7, 2016, now Pat. No. 10,454,971.

(51) Int. Cl.
*G06F 21/55* (2013.01)
*H04L 29/06* (2006.01)

(52) U.S. Cl.
CPC .......... *H04L 63/20* (2013.01); *G06F 21/554* (2013.01); *H04L 63/105* (2013.01); *H04L 63/1433* (2013.01)

(58) Field of Classification Search
CPC ........................... G06F 21/554; H04L 63/102
See application file for complete search history.

(56) References Cited

U.S. PATENT DOCUMENTS

| 8,615,807 | B1 | 12/2013 | Higbee et al. |
| 8,776,168 | B1 | 7/2014 | Gibson et al. |
| 8,782,782 | B1 | 7/2014 | Dicovitsky et al. |
| 2005/0209878 | A1 | 9/2005 | Fujino et al. |
| 2006/0047544 | A1 | 3/2006 | Habon et al. |
| 2006/0160059 | A1 | 7/2006 | Dompier et al. |
| 2006/0183099 | A1 | 8/2006 | Feely et al. |
| 2007/0067441 | A1 | 3/2007 | Pomerantz |
| 2011/0171621 | A1 | 7/2011 | Sims et al. |

(Continued)

FOREIGN PATENT DOCUMENTS

WO    2015123544 A1    8/2015

OTHER PUBLICATIONS

Anonymous, "BeyondTrust, Mitigating the Risks of Privilege-based Attacks in Federal Agencies", Internet, Jun. 15, 2016, https://www.beyondtrust.com/resources/white-paper/privileged-account-management-solutions-us-government/.

(Continued)

*Primary Examiner* — David J Pearson

(57) ABSTRACT

Managing privileged system access may be performed by a risk management system controlling user access privilege to production systems. One example method of operation may provide at least one of detecting an insecure user action at a user device, reducing an access privilege of a user profile associated with the user device to one or more privileged production servers, providing the user device with an application based on the insecure user action, determining that an outcome associated with the application has been achieved, and re-instating the access privilege of the user profile.

25 Claims, 12 Drawing Sheets

(56) References Cited

U.S. PATENT DOCUMENTS

| | | |
|---|---|---|
| 2011/0209196 A1 | 8/2011 | Kennedy |
| 2012/0124671 A1 | 5/2012 | Fritzson et al. |
| 2013/0081138 A1 | 3/2013 | Rados et al. |
| 2013/0238994 A1 | 9/2013 | Yurasits |
| 2013/0268994 A1 | 10/2013 | Cooper et al. |
| 2014/0137190 A1 | 5/2014 | Carey et al. |
| 2014/0199663 A1 | 7/2014 | Sadeh-Koniecpol et al. |
| 2014/0199664 A1 | 7/2014 | Sadeh-Konieopol et al. |
| 2015/0039653 A1 | 2/2015 | Apsel |
| 2015/0229664 A1 | 8/2015 | Hawthorn et al. |
| 2016/0036829 A1 | 2/2016 | Sadeh-Koniecpol et al. |
| 2016/0330238 A1 | 11/2016 | Hadnagy |

OTHER PUBLICATIONS

Ford, "Keys to the Kingdom: Monitoring Privileged User Actions for Security and Compliance", Internet, May 2010, https://www.sans.org/reading-room/whitepapers/analyst/keys-kingdom-monitoring-privileged-user-actions-security-compliance-34890.

List of IBM Patents or Patent Applications Treated as Related, Oct. 6, 2019.

E. Chalmers et al., "Managing Privileged System Access Based on Risk Assessment", U.S. Appl. No. 15/258,310, filed Sep. 7, 2016.

180

```
┌─────────────────────────────┐
│  DETECTING AN INSECURE      │
│  USER ACTION AT A USER      │
│  DEVICE                     │
│  181                        │
└─────────────────────────────┘
              │
              ▼
┌─────────────────────────────┐
│  REDUCING AN ACCESS         │
│  PRIVILEGE OF A USER        │
│  PROFILE ASSOCIATED WITH    │
│  THE USER DEVICE TO ONE OR  │
│  MORE PRIVILEGED            │
│  PRODUCTION SERVERS         │
│  182                        │
└─────────────────────────────┘
              │
              ▼
┌─────────────────────────────┐
│  PROVIDING THE USER DEVICE  │
│  WITH AN APPLICATION BASED  │
│  ON THE INSECURE USER       │
│  ACTION                     │
│  183                        │
└─────────────────────────────┘
              │
              ▼
┌─────────────────────────────┐
│  DETERMINING THAT AN        │
│  OUTCOME ASSOCICATED WITH   │
│  THE APPLICATION HAS BEEN   │
│  ACHIEVED                   │
│  184                        │
└─────────────────────────────┘
              │
              ▼
┌─────────────────────────────┐
│  RE-INSTATING THE ACCESS    │
│  PRIVILEGE OF THE USER      │
│  PROFILE                    │
│  185                        │
└─────────────────────────────┘
```

FIG. 1D

MANAGING PRIVILEGED SYSTEM ACCESS BASED ON RISK ASSESSMENT

TECHNICAL FIELD

The present application relates to system security, and more specifically, to managing privileged system access based on risk assessment.

BACKGROUND

Users having access to production systems can inadvertently compromise the security and integrity of their local workstation and attached systems due to poor secure computing practices. For example, a user might inadvertently click on a link in a communication (such as a phishing email) resulting in malware installation taking place. Subsequently, the user might access a remote computer system hosting a commercial production workload from their compromised workstation, placing data in that remote production system at risk.

Current systems may rely on anti-virus software running on a user's workstation to detect and quarantine any malware. However, users themselves may not be aware that they have performed an insecure computing practice or that the anti-virus software on their computer has quarantined such malware.

SUMMARY

According to one aspect of the present application there is provided a computer-implemented method for managing privileged system access performed at a risk management system controlling user access privilege to production systems. The method may include at least one of: detecting an insecure user action at a user device, reducing an access privilege of a user profile associated with the user device, to one or more privileged production servers, providing the user device with an application based on the insecure user action, determining that an outcome associated with the application has been achieved, and re-instating the access privilege of the user profile.

According to another aspect of the present application there is provided a system for managing privileged system access, including at least one of a risk management system controlling user access privilege to production systems. The risk management system includes at least one processor and at least one memory configured to provide computer program instructions to the processor to execute the function of the components including at least one of: a risk management component configured to control user access privileges to one or more privileged production servers, wherein the risk management server includes a processor and a memory configured to provide computer program instructions to the processor to execute functions, a user monitoring component that detects an insecure user action at a user device, a user access update component that reduces an access privilege of a user profile associated with the user device to the one or more privileged production servers, and an application component that provides the user device with access to an application based on the insecure user action, wherein the user access update component determines that an outcome associated with the application has been achieved and re-instates the access privilege of the user profile.

According to a yet another aspect of the present application there is provided a computer program product for managing privileged system access, the computer program product including a computer readable storage medium having program instructions embodied therewith, the program instructions executable by a processor to cause the processor to perform at least one of: detect an insecure user action of a user at an end user system, access a user profile for the user and reducing an access privilege of the user to privileged production systems, provide the user with access to a training session at their end user system, and the training session is tailored to the insecure user action, and determine that the training session has been completed by the user and re-instating the access privilege of the user.

According to a further aspect of the present application there is provided a method comprising at least one of detecting an insecure user action at a user device, reducing an access privilege of a user profile associated with the user device, to one or more privileged production servers, providing the user device with an application based on the insecure user action, determining that an outcome associated with the application has been achieved, and re-instating the access privilege of the user profile.

BRIEF DESCRIPTION OF THE DRAWINGS

The application, both as to organization and method of operation, together with objects, features, and advantages thereof, may best be understood by reference to the following detailed description when read with the accompanying drawings. Preferred embodiments of the present application will now be described, by way of example only, with reference to the following drawings.

FIG. 1D is a flow diagram of an example embodiment of a method in accordance with the present application.

Figure 1A:
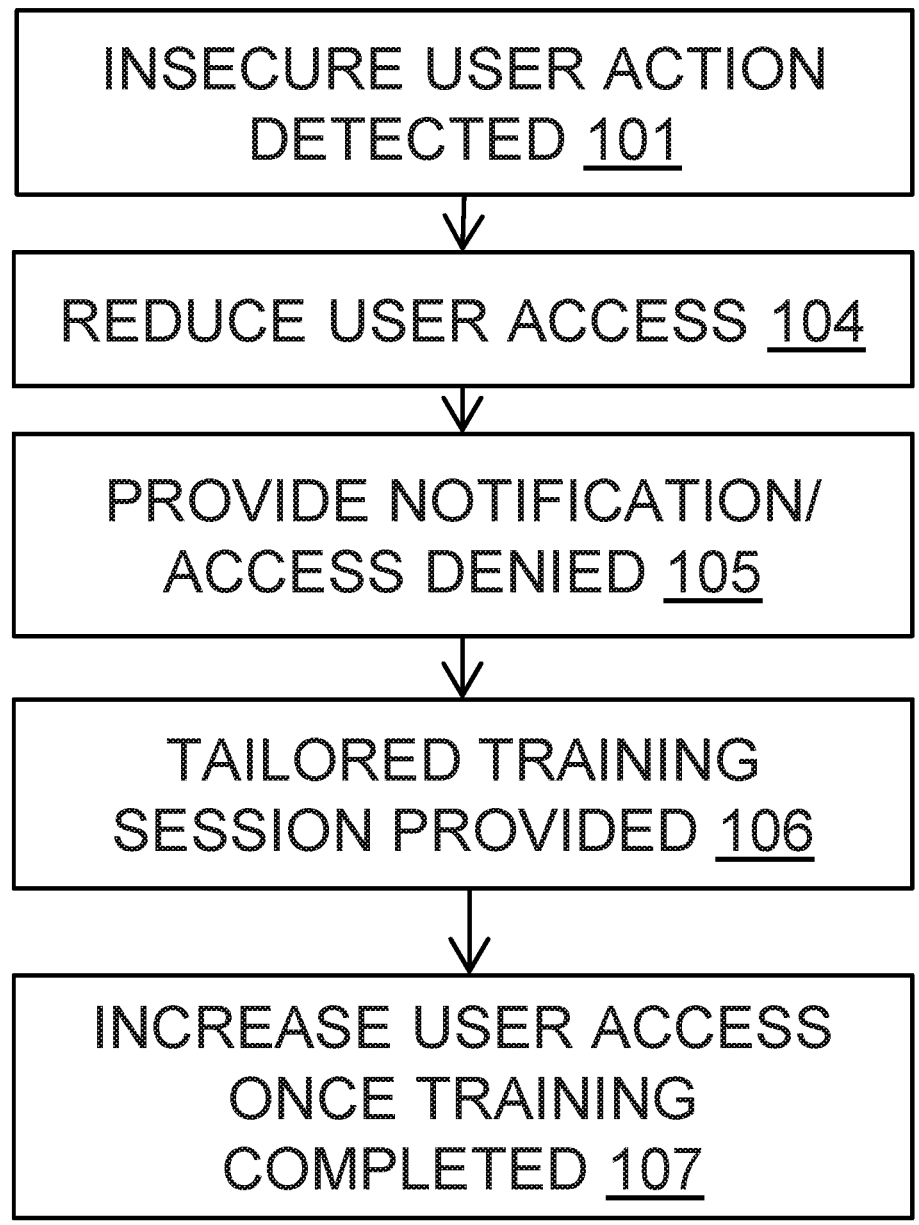
FIG. 1A is a flow diagram of an example embodiment of a method in accordance with the present application.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The described method, system and non-transitory computer readable medium, in various embodiments, protect systems by monitoring for insecure computing practices and restricting access when appropriate.

Systems, such as production systems, are any set of computers that host an enterprise commercial workload and can include on-site systems running enterprise applications, public or private cloud-hosted systems running commercial applications, etc. Privileged users are able to access and initiate defined actions with respect to such production systems. Privilege may be defined as the delegation of authority over a computer system, device and/or resource, and permission to perform an action on the computer system or resource, which may be granted prior to or contemporaneous with an operation (such as an access operation). Examples of privilege include a permission to create a file, read or delete a file, access a device, read or write permission to a socket for communicating over the Internet, etc.

Privileged users having access to production systems can inadvertently compromise the security and integrity on their local workstation and the systems they access from that workstation through poor secure computing practices. For example, a user may access sites or applications which have malicious code which can compromise the user's environment or any environment operated by the user. A privileged user may perform insecure computing practices, often unknowingly or through lack of knowledge or discipline, due to online scams, poor user practices, lack of training, etc. Insecure computing practices may include, for example, selecting a link in a phishing email, browsing a non-approved or malicious website, accessing a non-approved cloud-hosted system, uploading files to an unapproved destination, attaching a non-approved external device to a workstation, etc.

The instant solution, in one embodiment, may monitor for such insecure user activity and may ensure that a user's privileged access is suspended, if required, and is only restored when the user has completed training appropriate to the type of insecure computing practice that has been performed and/or when other remedial measures required by the application have been fulfilled.

Identity and access management systems may be capable of restricting user access to production systems based on profile information and policy configurations. The instant solution may combine those systems and/or functionality with insecure computing practice detection and/or a user's training records.

Commercial production systems may permit access by privileged users who may perform insecure computing practices. Specific pseudo-targeted attacks or tests may be generated by the instant solution in order to discover the user population who might not have proper training around secure computing practices. The instant solution may automatically restrict a user's access to certain systems if the user responded to targeted attacks or perform insecure computing practices.

For example, an instant system might generate a phishing email with a link to a resource that looks harmless, even disguised as company business. If a user responds to such a phishing attack, then the system may immediately reduce their existing login access to any production systems containing any data, such as confidential data. The system may be configured to only allow access to production systems again when the user has completed some action(s) such as answering various questions, agreeing to further on-line system monitoring, completing appropriate training, and the like.

The type of training that the user may be required to receive may be tailored to the type of insecure computing practice that the user has performed. In this example, recognizing phishing emails and/or how to report those emails appropriately may be examples of such training. Rather than committing the user to time-consuming actions, such as a training course covering a wide variety of topics, the user might only have to complete a short course covering the type of attack to which they responded. Criteria for establishing the type of test required for a particular user account may include identifying when the profile was created and depending on the age of the profile, the training, which may be in the form of a test, may be more complicated, specific, basic or fundamental. The older the profile the more focused the test material may become. Additionally, another metric that can be considered, other than age of the profile, is how active a user profile is. For example, the more access attempts performed may dictate the type of test required to be administered to maintain security rights and/or privileges assigned to that user profile. Also, the variety and type of system functions, files and computing equipment, such as server(s), that the user is accessing may also trigger specific actions, such as questions and tests, to be provided to the user device and/or updated in the user profile, prior to privileges being reinstated.

FIGS. 1A-1D and 6A-6D illustrate example flow diagrams of operations included in examples embodiments of methods of managing privileged system access.

A software component (which may include a specific software agent running on a user device and/or a system device) may be provided to a user system device to monitor a user's actions and report to a computer such as a risk management system server or administrative device, which may be positioned in, or accessed via, an enterprise network. The risk management system may remotely monitor an end user system for more updated information. One or more of the steps depicted in FIGS. 1A-1D and 6A-6D may be performed by a risk management system (described in more detail in FIG. 2) or other communicably coupled systems.

Figure 2:
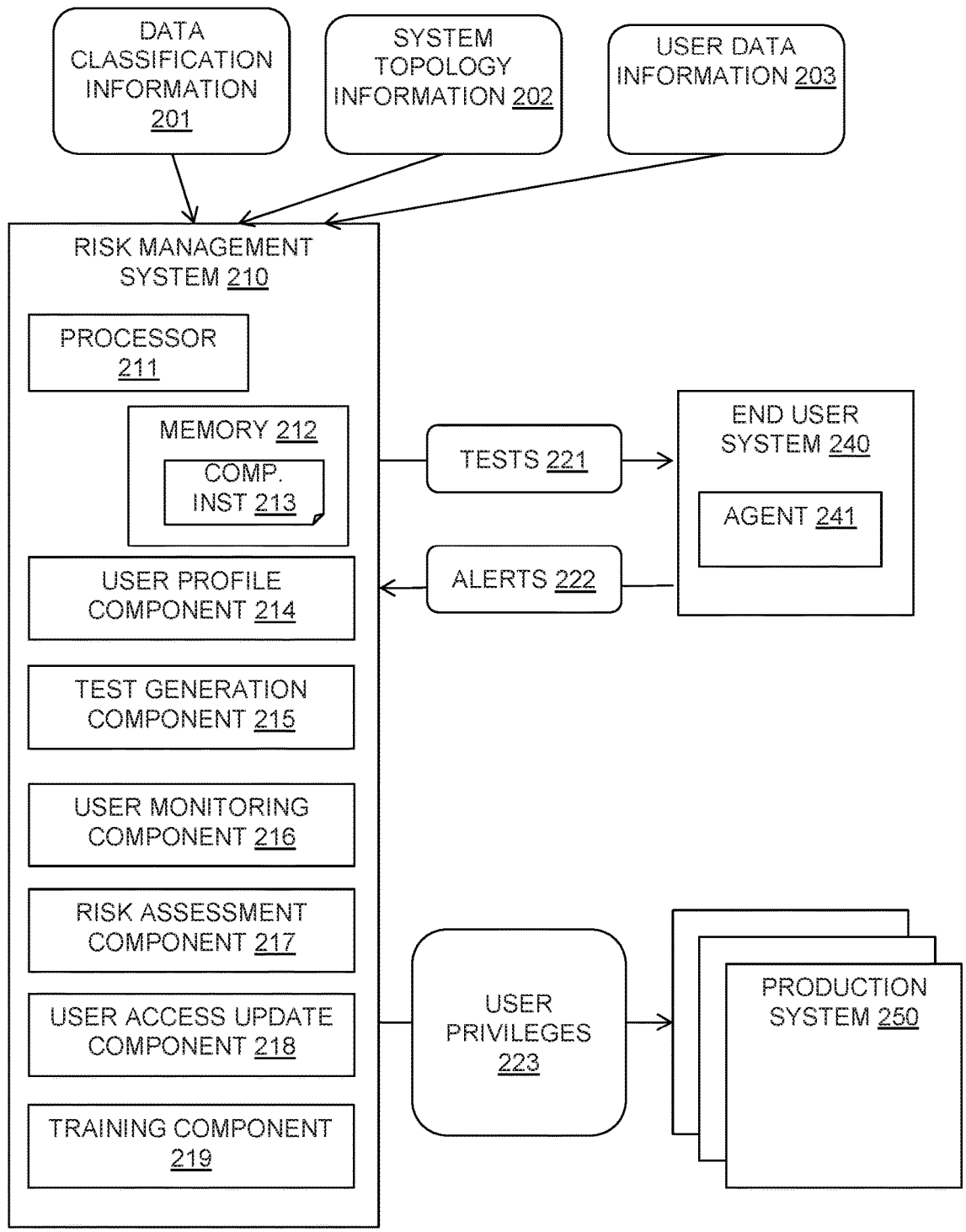
FIG. 2 is block diagram of an example embodiment of a system in accordance with the present application.

Referring now to FIG. 1A, a method 100 may include one or more of: detecting an insecure user action 101 at an end user device or system (described in more detail in FIG. 2). For example, a notification may be received from a computer program and/or a software agent running on, in communication with, an end user system or device (such as a wired or wireless communication device). The risk management system may reduce 104 the user access in response to the detection, for example by performing one or more of: changing user access privileges for the user to a non-access status, a reduction in privileges, a temporary access with an expiration period to complete the needed training, and the like. The reduction in the user access privileges may be directly relevant to the insecure action detected.

In other embodiments, a continued monitoring (with or without the user's knowledge) of a user's actions on a user device can occur without any loss of privilege to further assess whether any action needs to be taken.

A notification may be provided 105 to the end user system that a security aspect has been violated and that access privileges have been reduced or suspended. A notification or invitation to a tailored training session may be provided 106 to the end user system device. The tailored training session may be relevant to the insecure action performed by the user. According to one example, a user could receive partial access based on the severity of an offense. An example might include moving a user profile from one group to another group with less privileges but still preserving certain privileges while others are suspended pending a result. As a practical example, a server might have different groups defined with different sets of permitted commands. The user's group membership would be changed from a group with full modify privileges to a group with read-only access on the system.

The performance of the training session at the end user system may be monitored. Once the tailored training session has been completed by the user, the risk management system may reinstate or increase 107 the user's access privileges. The training may include multiple pages of content that must be accessed and logged electronically via an online test conducted in a web browser and/or via an app or application running on or accessible via the user device. The training may include a test or images which are required to be accessed by the user's device. A score may be tabulated depending on the nature of the training and the score may be required to be above a minimum threshold in order to reinstate the user's privileges.

Figure 1B:
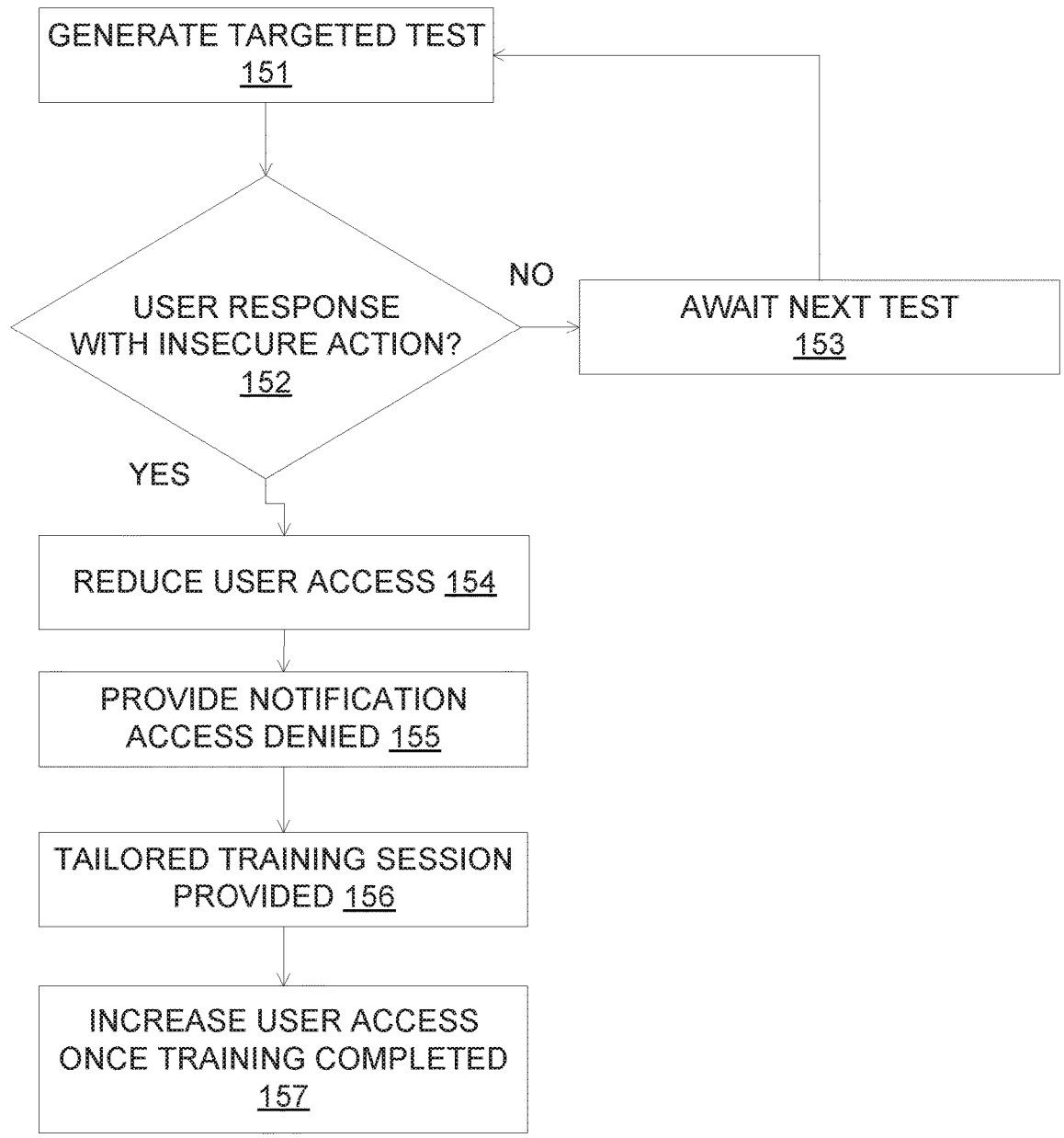
FIG. 1B is a flow diagram of an example embodiment of a method in accordance with the present application.

Referring to FIG. 1B, a flow diagram 150 illustrates another example embodiment of the instant application in which one or more of the following occurs: a targeted test, which may include an intentional malicious attack or a seemingly intentional malicious attack, is generated 151 by a risk management system (described in more detail herein) and sent to an end user device or system. It may be determined 152 whether the user responds to the test or attack with an insecure action, within a certain period of time in some embodiments. If the user does not take action and enact the potential attack, the method may await another test at a later time 153 (or provide immediate system privileges, not shown). If the user does respond to the attack with an insecure action, one or more of the steps as shown in FIG. 1B may be performed.

The risk management system may reduce 154 the user access, for example by changing user access privileges. The reduction in user access may be directly relevant to the generated attack or test. A notification may be provided 155 to the end user system that a security aspect has been violated and that access privileges have been reduced, temporarily rescinded or permanently rescinded. A notification or invitation to a tailored training session may be provided 156 to the end user system. The tailored training session may be relevant to the generated attack or test. Once the tailored training session has been successfully completed by the user, the risk management system may reinstate or increase 157 the user's access privileges.

Figure 1C:
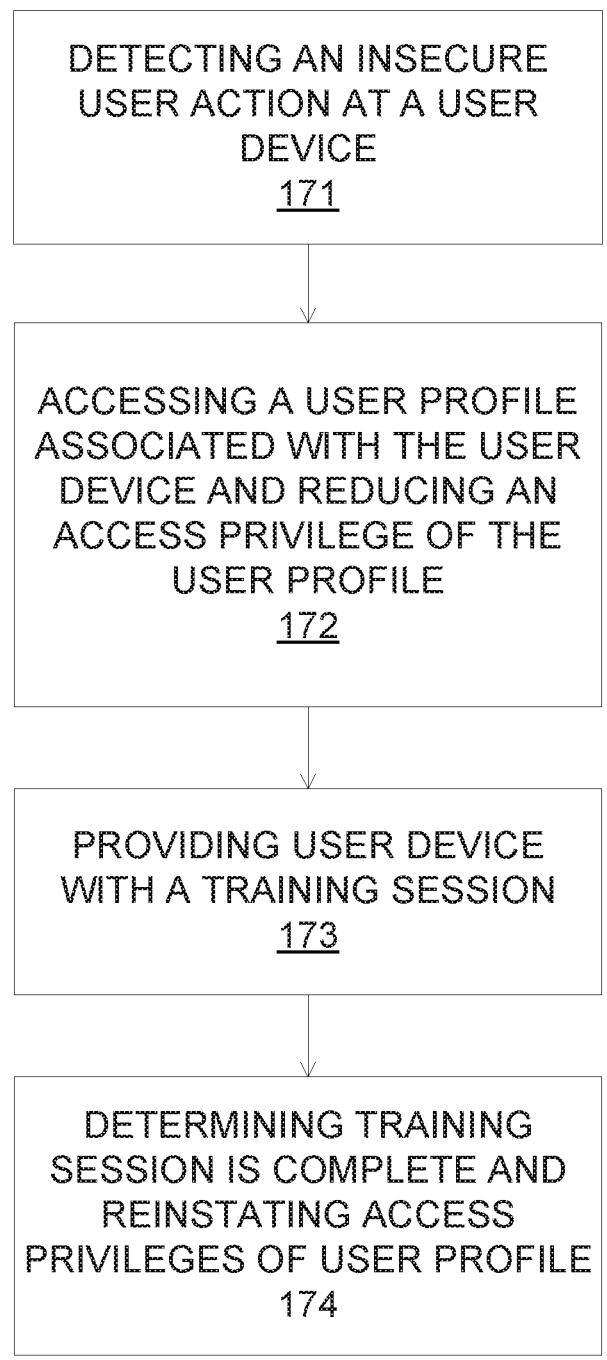
FIG. 1C is a flow diagram of an example embodiment of a method in accordance with the present application.

FIG. 1C illustrates an example method of operation 170 which includes one or more of: detecting an insecure user action at a user device 171 and accessing a user profile associated with the user device and reducing an access privilege of the user profile to one or more privileged production servers 172. Further, the user device may be provided with a training session 173 that is based on the insecure user action, and once the training session has been successfully completed, the access privilege(s) of the user profile is re-instated 174.

FIG. 1D depicts a flow diagram of example embodiments of a method in accordance with the present application. Referring to FIG. 1D, a flow diagram 180 includes a method comprising one or more of: detecting an insecure user action at a user device 181, reducing an access privilege of a user profile associated with the user device, to one or more privileged production servers 182, providing the user device with an application based on the insecure user action 183, determining that an outcome associated with the application has been achieved 184, and re-instating the access privilege of the user profile 185. The user profile can undergo some satisfaction requirement in order to regain privileges, whether it be a test, elapsed time, or some other requirement.

Referring to FIG. 2, a block diagram illustrates an example embodiment of the present application. The system 200 may include a system, such as a risk management system 210, which may include at least one of: a processor 211, a hardware module (not shown), or a circuit (not shown) that executes the functions of the described components which may be software units executing on the at least one processor. The risk management system 210, in one embodiment, may be any device comprising a processor and memory. Multiple processors running parallel processing threads (not shown) may be provided enabling parallel processing of some or all of the functions of the components. Memory 212 may be configured to store computer instructions 213 that can be provided to or accessed by the at least one processor 211 to perform the functionality of the components. In other embodiments, the computer instructions 213 may be located on another system (not shown) that is communicably coupled to the risk management system 210.

The risk management system 210 may be part of an identity and access management system of an enterprise or other entity regulating the identities and access of users of end user system(s) 240 and their access to privileged production system(s) 250 of the enterprise. In one embodiment, the risk management system(s) 210 and the production system(s) 250 may be a same system(s). The risk management system 210 may receive data classification information 201 indicating what type of information are stored on the different systems (for example, confidential data, personal information, sensitive personal information, etc.), role information and/or system topology information 202 for the systems/devices that need to be protected, and user data information 203 (such as a user profile, other user data, other users with privileges, etc.).

The risk management system 210 may include a user profile component 214 that maintains a user profile based on the input user data information 203 used to apply user privileges 223 to productions systems 250 by a user of an end user system 240. The risk management system 210 may include a user monitoring component 216, which may interact with an agent 241 in the form of a monitoring application at the end user system 240 to determine if a user carries out an insecure act using their end user system 240. For example, the monitoring application may determine if the user connects to an external service or resource that is not approved, such as a particular application, site, etc., attaches an external device that is not approved, for example, a USB device, visits a website that is not approved, communicates with an improper email or instant messaging address, etc. If such an action occurs, the agent 241 may block the action and issue an alert 222 to the risk management system 210.

The risk management system 210 may include a test generation component 215 for generating targeted tests, which may simulate an attack such as a phishing attack or a entice a nefarious link or attachment, which contains malware, to be downloaded. The test generation component 215 may generate one or more targeted tests 221 that may be sent to end user systems 240. Each test may be different and may be tailored for each level of privilege afforded by the system and for each scenario likely to be encountered by such system users. A first particular test may be sent to one or more end user system(s) 240 having certain user profile characteristics or certain access privilege(s) which require such a test as determined by the risk management system 210. In this way, pro-active tests may be used to test a user's response to such a controlled or simulated attack to evaluate whether the user responds appropriately, in one embodiment, by not responding at all.

The user monitoring component 216 may be used to monitor the response of the user via the end user system 240. An alert 222 may be generated if the user makes an insecure or improper response. Since the response is to a test action, there is no actual risk that the user will compromise the production systems.

The risk management system 210 may include a risk assessment component 217 for assessing the risk posed by the response to the tests 221 or from a monitored behavior of the user. The system 210 may perform a risk assessment based on the user's privileges and current system access. The system may update a user's privileged system access and revoke access to systems containing confidential or sensitive information. The risk management system 210 may include a user access update component 218 to reduce a user's access privilege(s) 223 responsive to a response message to a test or an insecure action being conducted by the end user system 240. The risk management system 210 may include a training component 219 for providing a training session to the user of the end user system 240 which may be tailored to the test(s) 221 or insecure action carried out by the user. Examples of training modules may include: how to recognize and respond to phishing emails, cloud storage systems supported by the enterprise, attaching external devices to an enterprise device, how to take appropriate actions after a nefarious act has been committed, etc. Instead of a test, in other remedy approaches, a re-approval from a manager or other approver, including computer instructions 213, can be performed. For example, a different user profile with privileges or with certain authority to change a user's access levels can reinstate the user's privileges. In one embodiment, once a period of time has elapsed with no further offences from the user and/or with minor offenses from the user, the user profile may be switched or updated to allow full system access or to allow access to a separate device which may be pre-approved and may be different than the user's usual device.

The training component 219 may monitor the user's completion of the training session and the user access update component 218 may increase the user's access privileges 223 once the training has been completed. The increase in the user's access privileges 223 may re-instate the reduced user privileges or may allow new privileges due to the training being completed. The risk management system 210, in one embodiment, may restore system access, elevate privileges and change user profile status when the end user has completed the appropriate training. The risk management system 210 may generate targeted secure computing tests 221 for end users and accept secure computing alerts 222 from end user systems 240. When suspending user access, different actions can be taken based on the severity of the offense, such as block the user immediately, warn the user that their access will be blocked in a certain time period unless an activity is completed within the time period, and the like. In another example, the application monitors the user's actions and assesses whether those actions are further insecure user actions or are non-insecure user actions. The monitoring may occur with or without the user's knowledge. If it is determined that the user's actions are non-insecure based on a length of time, a number of actions, a sequence of actions, then access privileges of the user profile can be re-instated.

Figure 3:
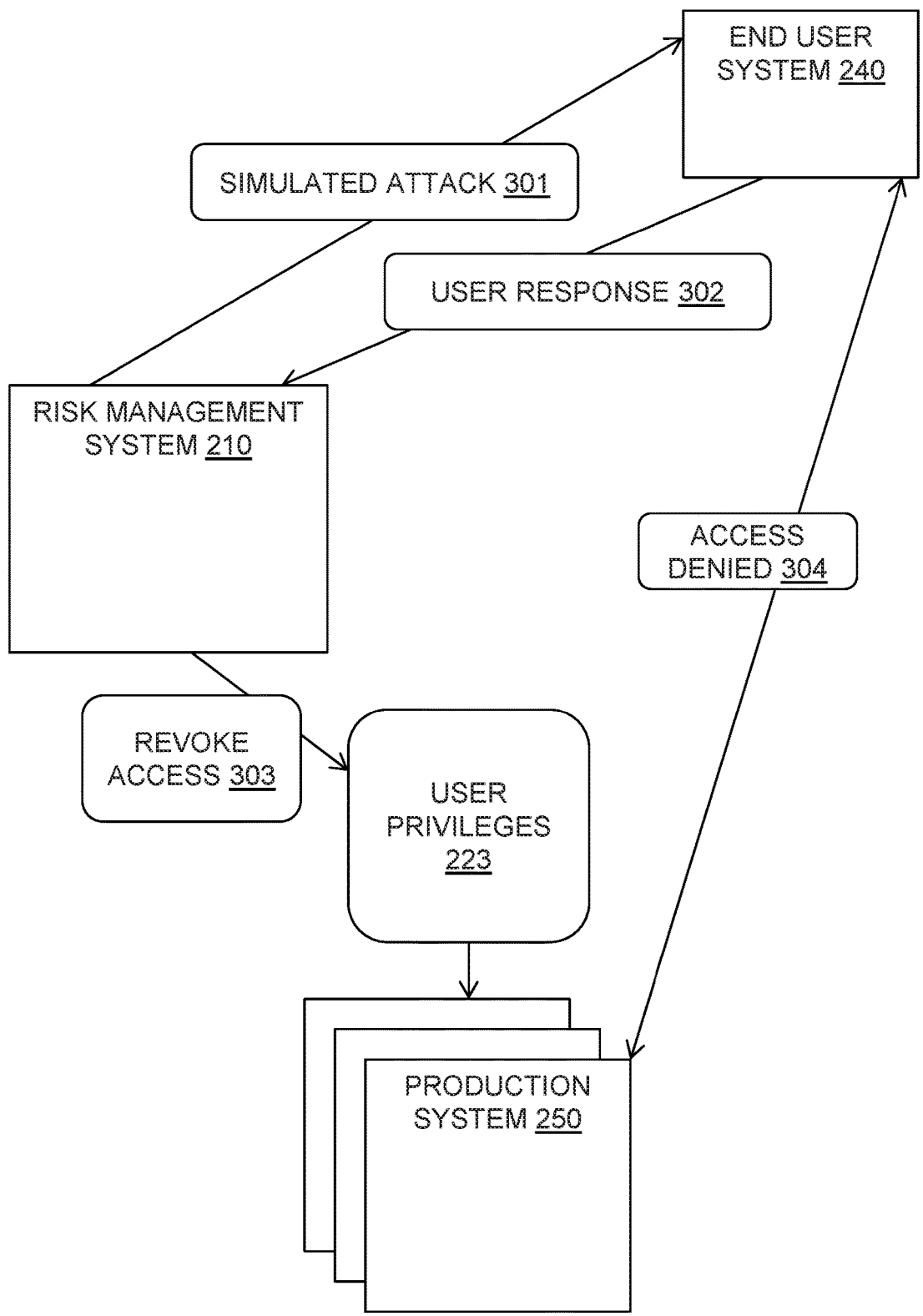
FIG. 3 is a schematic diagram of an example embodiment of an implementation of a system in accordance with the present application.

Referring to FIG. 3, a schematic diagram 300 illustrates an exchange of events between various entities in an example of the described steps and/or method(s). In this example, an end user system 240 responds to a risk management system 210 generated communication or message, such as a phishing email. The risk management system 210 may generate a plurality of simulated insecure computing attacks 301 which may be singular, sporadic or successive. The user of the end user system 240 may respond 302 to the attack by taking an action, for example, by clicking on a link provided in the email message. As the attack is simulated, a user's actions or responses on their device(s) are received by the risk management system 210.

Based on the response, the risk management system 210 revokes 303 the user's privileges 223, which may include complete revocation or partial revocation to various components or systems such as production system(s) 250. This may restrict the user's access specifically in response to the security breach, which would have been identified by the response 302. The user's subsequent attempt to access the production system 250 would thus be limited or denied 304. Further, the risk management system 210 may generate a notification to the end user system 240 informing one or more users of the event and status change to their user profile and requiring the user to undertake an action(s), such as an appropriate training course. When the training has been completed (and verified), the risk management system 210 may grant the limited or lost access privilege again or enact other privileges depending on the result of the training session and severity of the event.

Figure 4:
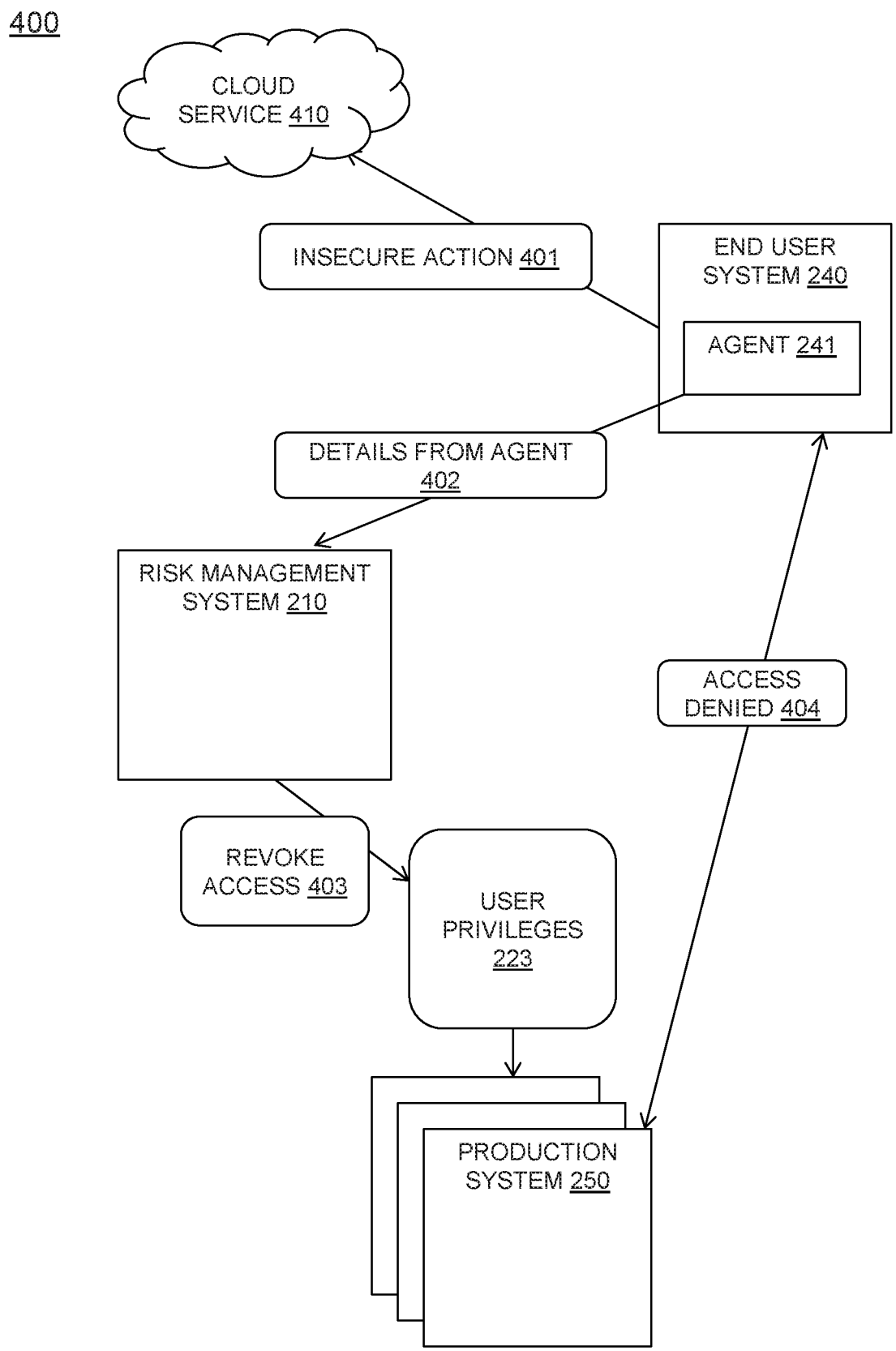
FIG. 4 is a schematic diagram of an example embodiment of an implementation of a system in accordance with the present application.

Referring to FIG. 4, a schematic diagram 400 illustrates another example flow of events between entities in an embodiment of the described steps and/or method(s). In this example, an agent 241 on the end user system 240 may detect privileged users using an unsupported cloud service 410. The user of the end user system 240 may perform an insecure action 401 such as uploading a document to an unsupported cloud based application or service 410. The agent 241 operating on the user's end user system 240 may forward the details 402 to the risk management system 210. The risk management system 210 may limit or revoke 403 the user's privileged access 223 to the production system(s) 250. The user's attempt to access the production system(s) 250 would be limited or denied 404.

The risk management system 210 may generate a notification to the user informing them of the events or actions taken by the user and requiring the user to undertake appropriate training or particular reinstatement procedure. When the training has been completed, the risk management system 210 may grant the limited or lost access privilege again or enact other privileges depending on the result of the training session and severity of the event.

In operation, the system application/server may monitor a user's usage from a security perspective of different applications and limit their access to a production system accordingly. For example, the described method monitors a user's compliance to security policies, and based on the level of compliance "risk assessment" restricts access to privileged systems. In the case of a poor level of compliance, a user may be recommended specific training in order to boost his/her compliance level and thus restore access to the privileged systems.

The example steps(s) and/or methods, according to example embodiments, monitor a user's behavior on their workstations, which may not be a privileged or protected system, and based on that behavior the method may prevent access to a protected system. An evaluation of the client's risk is made via separate tests, regardless of whether they are accessing the protected server or not. For example, the user might access an unsupported third party cloud system that is considered insecure. Based on this behavior, the user's access to the protected system may be blocked. As such, in this example, the user is blocked before access to the protected system is achieved.

The example method may proactively generate tests for known privileged users to determine their current risk. The method may then generate a targeted set of training items for the user based on their risky behavior, such as only permitting access to protected systems when training has been completed.

In one embodiment, a method comprises detecting an insecure user action at a user device, reducing an access privilege of a user profile associated with the user device, to one or more privileged production servers, providing the user device with an application based on the insecure user action, determining that an outcome associated with the application has been achieved, and re-instating the access privilege of the user profile.

With this example method, detecting the insecure user action at the user device further comprises receiving feedback from a monitoring agent operating on the user device regarding an insecure action performed by the user device, wherein the insecure action is identified as being part of a predefined set of insecure actions, detecting the insecure user action at the user device further comprises: generating a test attack application prompting the insecure user action, sending the test attack application to the user device, and receiving a response notification to the test attack identifying the insecure action, and reducing the access privilege of the user profile to one or more privileged production servers comprises at least one of: reducing the access privilege corresponding to the insecure user action, and providing a notification to the user device that access privileges have been reduced.

With this example method, the application is a training session and wherein the outcome being achieved is the training session being completed, where the insecure user action is an action that results in a compromise of the user device from which the one or more privileged production servers are accessed. In other embodiments, the application monitors the user's actions and assesses whether those actions are further insecure user actions or are non-insecure user actions. This monitoring may occur with or without the user's knowledge. If it is determined that the user's actions are non-insecure based on a length of time, a number of actions, a sequence of actions, and the like, the access privilege of the user profile is re-instated.

With this example method, user data information, including a user profile and role information is received, where a risk management component receives topology information for the one or more privileged production servers that are protected with privileged user access and data classification information listing types of information stored on the one or more privileged production servers.

In one embodiment, a system comprises a risk management component configured to control user access privileges to one or more privileged production servers, wherein the risk management server includes a processor and a memory configured to provide computer program instructions to the processor to execute functions, a user monitoring component that detects an insecure user action at a user device, a user access update component that reduces an access privilege of a user profile associated with the user device to the one or more privileged production servers, and an application component that provides the user device with access to an application based on the insecure user action, wherein the user access update component determines that an outcome associated with the application has been achieved and re-instates the access privilege of the user profile.

With the system, the user monitoring component detects the insecure user action at the user device by receiving feedback from a monitoring agent operating on the user device regarding an insecure action performed by the user device, where the insecure action is identified as being part of a predefined set of insecure user actions, where the user monitoring component detects the insecure user action at the user device by a test generation component which generates a test attack application which prompts the insecure user action, and receives a response notification of the test attack identifying the insecure action, where the user access update component that reduces the access privilege of the user to the one or more privileged production servers provides at least one of: reduces the access privilege corresponding to the insecure user action and provides notification to the user that their access privileges have been reduced.

With the system, the application is a training session and wherein the outcome being achieved is the training session being completed, wherein the insecure user action is an action that results in a compromise of the user device from which the one or more privileged production servers are accessed. In other embodiments, via the user monitoring component and the user device, the application monitors the user's actions and assesses whether those actions are further insecure user actions or are non-insecure user actions. This monitoring may occur with or without the user's knowledge. If it is determined that the user's actions are non-insecure based on a length of time, a number of actions, a sequence of actions, and the like, the access privilege of the user profile is re-instated.

With this example system, the risk management component receives user data information including a user profile and role information, and receives topology information for the one or more production servers that need to be protected with privileged user access and data classification information listing types of information stored on the one or more production servers.

In one embodiment, a non-transitory computer readable medium is configured to store instructions that when executed cause a processor to: detect an insecure user action at a user device, reduce an access privilege of a user profile associated with the user device, to one or more privileged production servers, provide the user device with an application based on the insecure user action, determine that an outcome associated with the application has been achieved, and re-instate the access privilege of the user profile.

With the non-transitory computer readable storage medium, the insecure user action is detected at the user device which further comprises the processor being configured to receive feedback from a monitoring agent operating on the user device regarding an insecure action performed by the user device, wherein the insecure action is identified as being part of a predefined set of insecure actions, where the insecure user action being detected at the user device further comprises the processor being configured to: generate a test attack application which prompts the insecure user action, sends the test attack application to the user device, and receives a response notification to the test attack which identifies the insecure action, where the access privilege of the user profile being reduced to one or more privileged production servers comprises the processor being configured to reduce the access privilege corresponding to the insecure user action.

Figure 5:
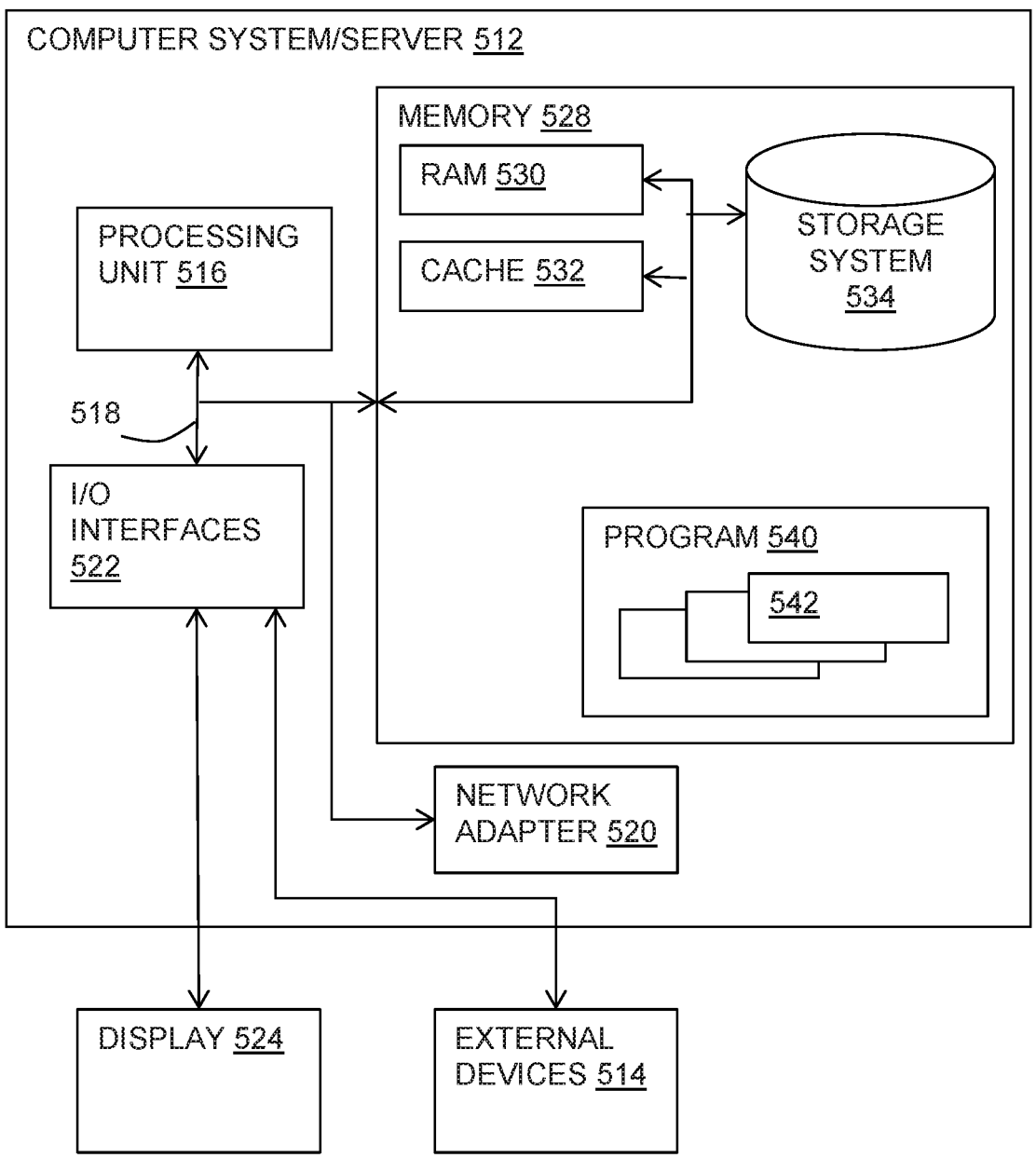
FIG. 5 is a block diagram of an embodiment of a computer system in which the present application may be implemented.

Referring now to FIG. 5, a schematic of an example of a system 500 in the form of a computer system or server 512 is shown in which aspects of the described system may be implemented including, the risk management system, end user system, and components of the production system(s).

A computer system or server 512 may be operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

In FIG. 5, a computer system/server 512 is illustrated in the form of a general-purpose computing device. The components of the computer system/server 512 may include, but are not limited to, one or more processors or processing units 516, one or more system memories 528, and a bus 518 that couples various system components including system memory 528 and processor 516. Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the application.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the application as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples of such systems include, but are not limited to: microcode, device drivers, redundant processing units, external disk drive arrays, RAID systems, tape drives, and data archival storage systems, etc.

Figure 6A:
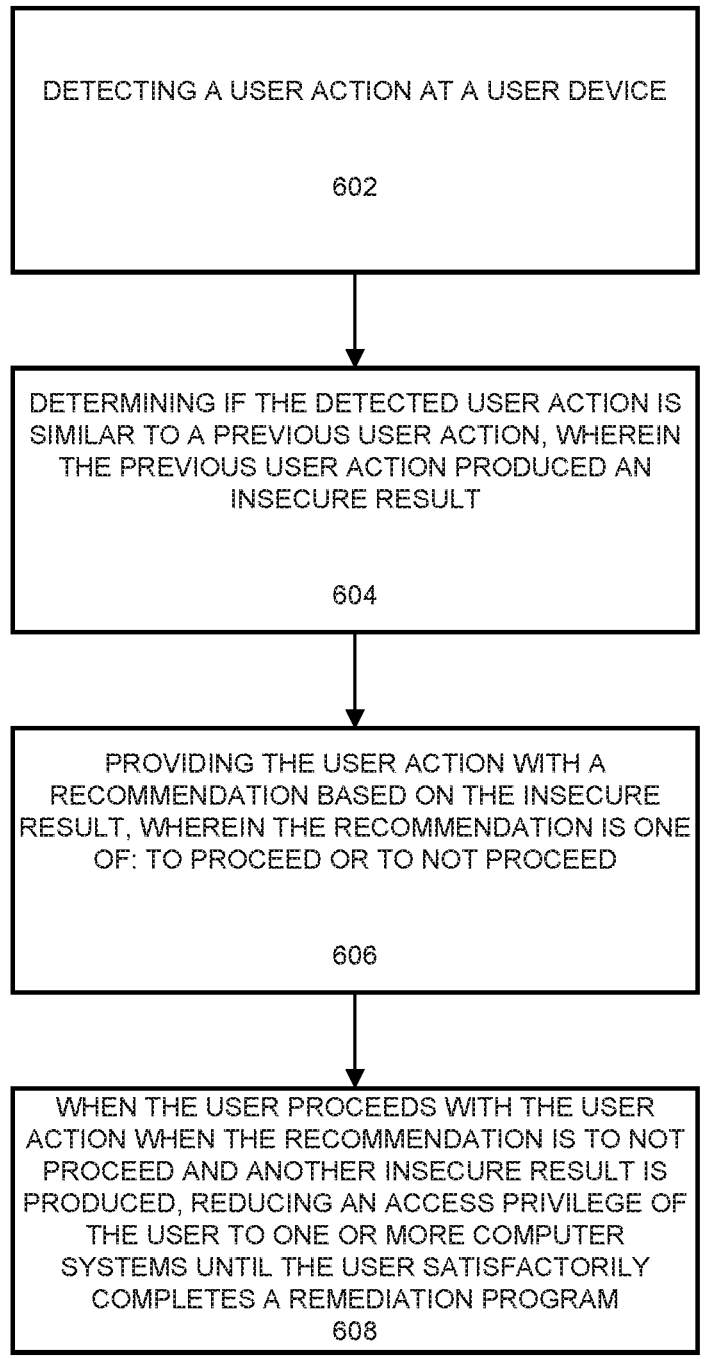
FIG. 6A is a flow diagram of an example embodiment of a method in accordance with the present application.

Referring now to FIG. 6A, a flow diagram 600 of an example embodiment of a method in accordance with the present application comprises one or more of: detecting a user action at a user device 602, determining if the detected user action is similar to a previous user action, wherein the previous user action produced an insecure result 604, providing the user action with a recommendation based on the insecure result, wherein the recommendation is one of: to proceed or to not proceed 606, and when the user proceeds with the user action when the recommendation is to not proceed and another insecure result is produced, reducing an access privilege of the user to one or more computer systems until the user satisfactorily completes a remediation program 608.

Figure 6B:
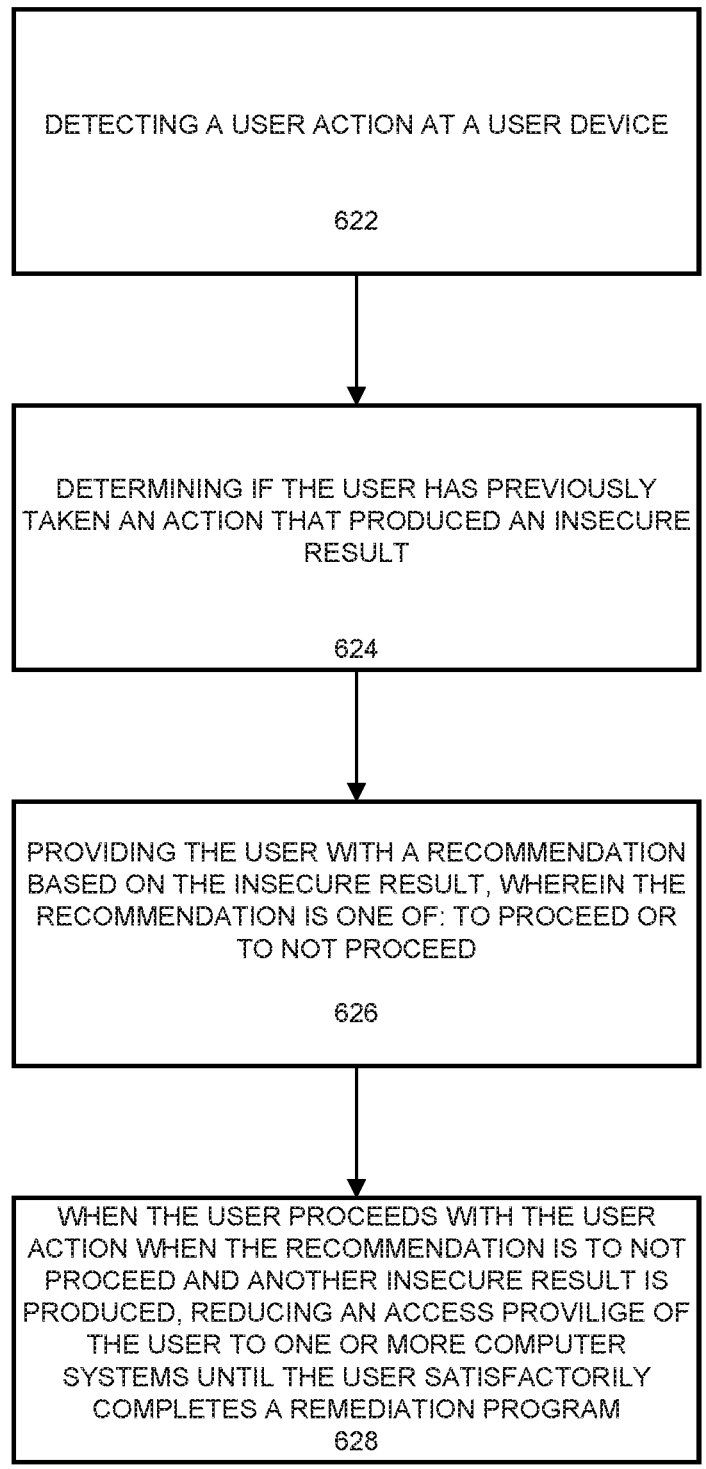
FIG. 6B is a flow diagram of an example embodiment of a method in accordance with the present application.

Referring now to FIG. 6B, a flow diagram 620 of an example embodiment of a method in accordance with the present application comprises one or more of: detecting a user at a user device 622, determining if the user has previously taken an action that produced an insecure result 624, providing the user with a recommendation based on the insecure result, wherein the recommendation is one of: to proceed or to not proceed 626 and when the user proceeds with the user action when the recommendation is to not proceed and another insecure result is produced, reducing an access privilege of the user to one or more computer systems until the user satisfactorily completes a remediation program 628.

With respect to FIGS. 6A and 6B, the detecting is based on one or more of: a biometric of the user, an identification of the user, an identification of the user device, a location of the user, and a location of the user device.

Figure 6C:
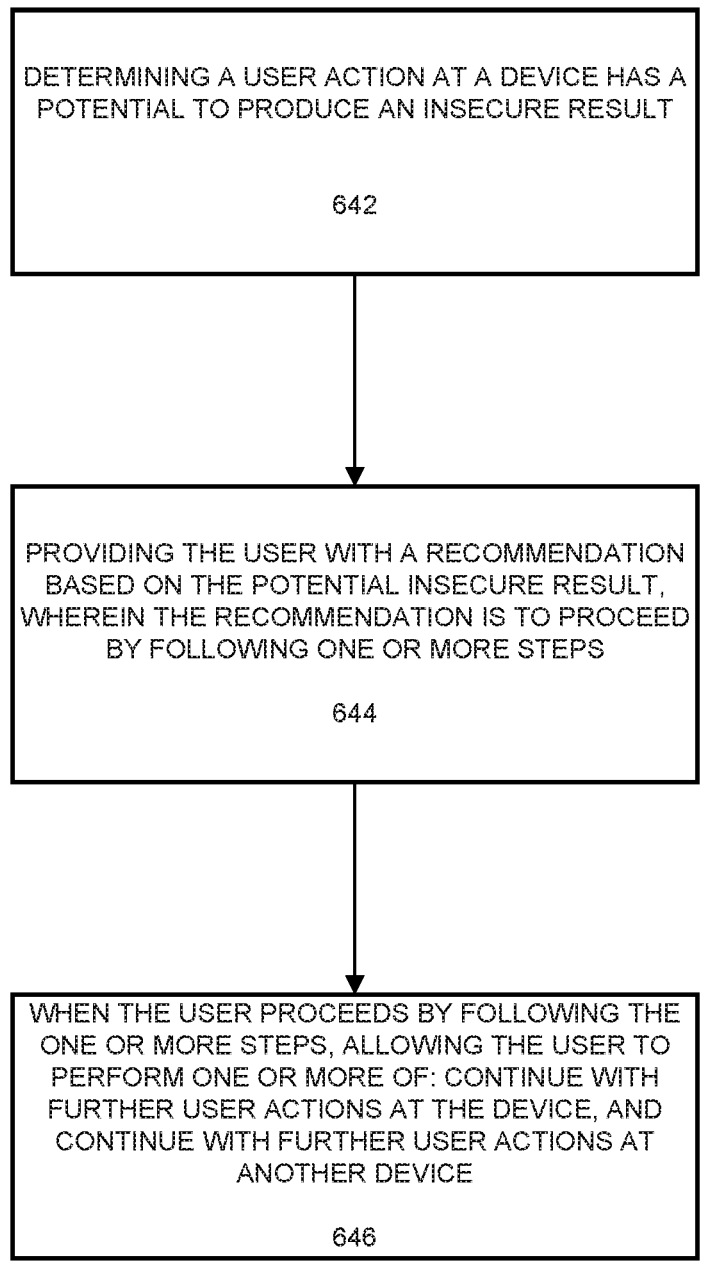
FIG. 6C is a flow diagram of an example embodiment of a method in accordance with the present application.

Referring now to FIG. 6C, a flow diagram 640 of an example embodiment of a method in accordance with the present application comprises one or more of: determining a user action at a device has a potential to produce an insecure result 642, providing the user with a recommendation based on the potential insecure result, wherein the recommendation is to proceed by following one or more steps 644, and when the user proceeds by following the one or more steps, allowing the user to perform one or more of: continue with further user actions at the device, and continue with further user actions at another device 646.

Figure 6D:
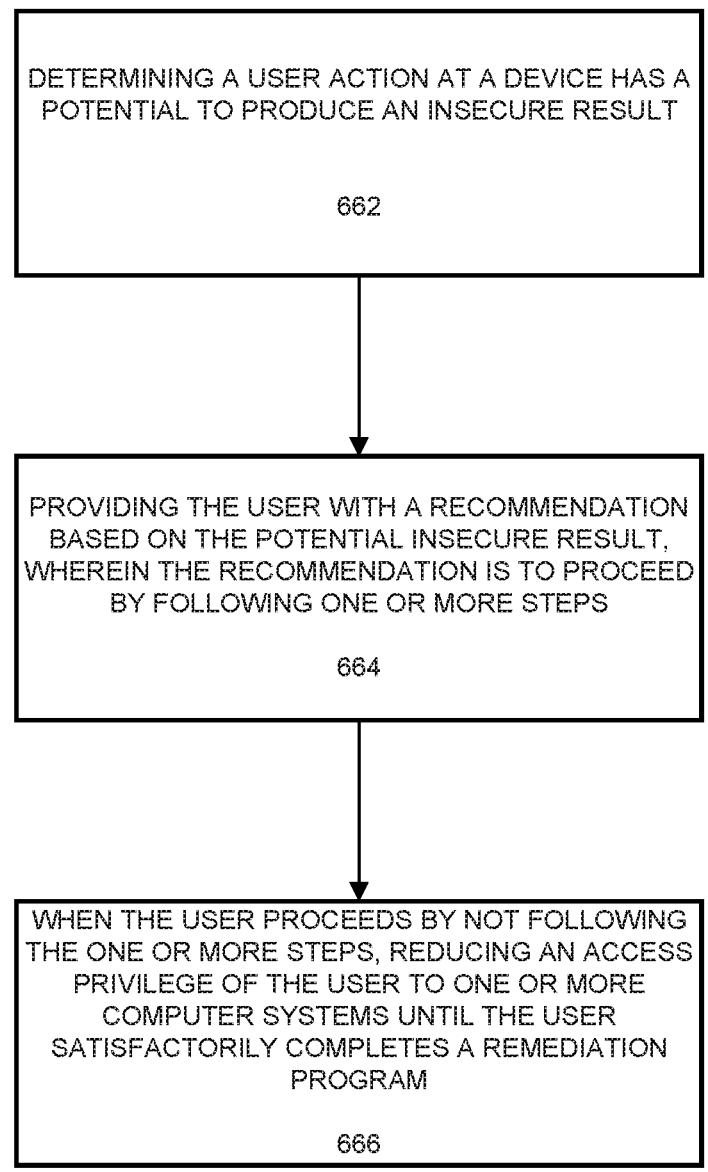
FIG. 6D is a flow diagram of an example embodiment of a method in accordance with the present application.

Referring now to FIG. 6D, a flow diagram 660 of an example embodiment of a method in accordance with the present application comprises one or more of: determining a user action at a device has a potential to produce an insecure result 662, providing the user with a recommendation based on the potential insecure result, wherein the recommendation is to proceed by following one or more steps 664, and when the user proceeds by not following the one or more steps, reducing an access privilege of the user to one or more computer systems until the user satisfactorily completes a remediation program 666.

With respect to FIG. 6D, the remediation program comprises one or more of: providing the device with an application based on the one or more steps not being followed, determining that an outcome associated with the application has been achieved, and re-instating the access privilege of the user.

The present application may be a system, a method, and/or a computer program product at any possible technical detail level of integration. The computer program product may include a computer readable storage medium (or media) having computer readable program instructions thereon for causing a processor to carry out aspects of the present application.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present application.

Aspects of the present application are described herein with reference to flowchart illustrations and/or block diagrams of methods, apparatus (systems), and computer program products according to embodiments of the application. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present application. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present application have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present application.

What is claims is:

1. A method, comprising:
   temporarily restricting one or more computing operations of a user device based on an insecure computing action;
   requesting a training session including a target set of training items, via the user device, based on a type of the insecure computing action and an age of a user profile of the user device; and
   re-instating the temporarily restricted one or more computing operations of the user device in response to the training session being completed.

2. The method as claimed in claim 1, further comprising detecting the insecure computing action via the user device.

3. The method as claimed in claim 2, wherein the detecting the insecure computing action via the user device comprises receiving feedback from a monitoring agent operating on the user device indicating an insecure computing action from among a predefined set of insecure computing actions has been detected.

4. The method as claimed in claim 2, wherein the detecting the insecure computing action via the user device comprises:
   generating a test attack application prompting the insecure computing action;
   sending the test attack application to the user device; and
   receiving a response notification to the test attack identifying the insecure computing action.

5. The method as claimed in claim 1, wherein the temporarily restricting comprises at least one of:
   reducing an access privilege corresponding to the insecure computing action; and
   providing a notification to the user device that access privileges have been reduced.

6. The method as claimed in claim 1, wherein the insecure computing action comprises one or more of an insecure web access performed via a web browser of the user device and an insecure external device being connected to the user device.

7. The method as claimed in claim 1, further comprising receiving user data information including a user profile and role information of the user device.

8. The method as claimed in claim 1, wherein the temporarily restricting comprises restricting access to one or more privileged production servers that are protected with privileged user access based on data classification information based on types of information stored on the one or more privileged production servers.

9. The method of claim 1, wherein the requested training session has an expiration period identifying a point in time by which it must be determined that the training session has been completed.

10. The method of claim 1, wherein the target set of training items for the training session are further identified from among a wider set of training items based on one or more of:
    the access activity of the user profile of the user device; and
    an unsupported cloud service or cloud application being accessed by the user device during the insecure computing action.

11. The method of claim 1, wherein how active the user profile of the user device is on the host system is determined based on an amount of access attempts to the host system made by the user profile via the user device.

12. The method of claim 1, wherein the re-instating of the one or more temporarily restricted computing operations of the user device is performed in response to automatically determining that a tabulated score of the training session is greater than a minimum threshold.

13. The method of claim 1, wherein the temporarily restricting comprises reducing access privileges of the user profile of the user device by revoking at least one permission of the user profile while allowing at least one permission of the user profile, based on a type of the detected insecure computing action.

14. A system, comprising:
    a processor device configured to temporarily restrict one or more computing operations of a user device, determine a target set of training items based on a type of the detected insecure computing action and how active a user profile of the user device is on a host system accessed by the user device, and automatically request a training session including the target set of training items via the user device, in response to the insecure computing action being detected, wherein the processor determines how focused the target set of training items are with respect to the type of detected insecure computing action based on an age of the user profile,
    wherein the processor device is further configured to automatically determine, via the user device, that the training session tailored to the insecure computing action is completed, and re-instate the one or more temporarily restricted computing operations of the user device in response to the training being completed.

15. The system as claimed in claim 14, wherein the processor device detects the insecure computing action at the user device based on feedback from a monitoring agent operating on the user device regarding indicating an insecure computing action from among a predefined set of insecure computing actions has been detected.

16. The system as claimed in claim 14, further comprising a network interface configured to receive a notification indicating the insecure computing action is detected at the user device.

17. The system as claimed in claim 16, wherein the processor device controls the network interface to transmit a test attack application to the user device which prompts the insecure computing action, and receive a response notification of the test attack that identifies the insecure computing action.

18. The system as claimed in claim 16, wherein the network interface further receives user data information including a user profile and role information of the user device.

19. The system as claimed in claim 14, wherein the processor device is configured to perform at least one of:
 reduce an access privilege that corresponds to the insecure computing action; and
 provides notification to the user device that access privileges have been reduced.

20. The system as claimed in claim 14, wherein the insecure computing action comprises one or more of an insecure web access performed via a web browser of the user device and an insecure external device being connected to the user device.

21. The system as claimed in claim 14, wherein the processor device is configured to temporarily restrict access to one or more production servers protected with privileged user access and data classification information based on types of information stored on the one or more production servers.

22. A non-transitory computer readable medium configured to store instructions that when executed cause a processor to:
 temporarily restricting one or more computing operations of a user device based on an insecure computing action;
 requesting a training session including a target set of training items, via the user device, based on a type of the insecure computing action and an age of a user profile of the user device; and
 re-instating the temporarily restricted one or more computing operations of the user device in response to the training session being completed.

23. The non-transitory computer readable storage medium as claimed in claim 22, wherein the processor is further configured to detect the insecure computing action via the user device.

24. The non-transitory computer readable storage medium as claimed in claim 23, wherein the processor detects the insecure computing action based on feedback from a monitoring agent operating on the user device indicating an insecure computing action from among a predefined set of insecure computing actions has been detected.

25. The non-transitory computer readable storage medium as claimed in claim 22, wherein the processor is further configured to:
 generate a test attack application which prompts the insecure computing action;
 send the test attack application to the user device; and
 receive a response notification to the test attack which identifies the insecure computing action.

\* \* \* \* \*